United States Patent [19]
Scorse et al.

[11] Patent Number: 5,128,776
[45] Date of Patent: Jul. 7, 1992

[54] PRIORITIZED IMAGE TRANSMISSION SYSTEM AND METHOD

[75] Inventors: Jim Scorse, Rochester; Daniel A. Throop, Victor; Adam Beck, Henrietta; Mark Jaworski, Fairport, all of N.Y.

[73] Assignee: Harris Corporation, Melbourne, Fla.

[21] Appl. No.: 367,365

[22] Filed: Jun. 16, 1989

[51] Int. Cl.$^5$ .............................................. H04N 1/41
[52] U.S. Cl. .................................. 358/426; 358/453; 358/432; 358/433; 382/9
[58] Field of Search ............... 358/426, 432, 433, 429, 358/261.1, 261.3, 453, 105, 133, 135, 136, 138; 382/54, 56, 9

[56] References Cited

U.S. PATENT DOCUMENTS

| | | | |
|---|---|---|---|
| 3,743,765 | 7/1973 | Maier | 358/426 |
| 4,694,352 | 9/1987 | Ina et al. | 358/426 |
| 4,803,685 | 2/1989 | Oget | 371/33 |
| 4,907,095 | 3/1990 | Komura et al. | 358/453 |
| 4,962,521 | 10/1990 | Komatsu et al. | 358/453 |

Primary Examiner—Edward L. Coles, Sr.
Assistant Examiner—Thomas D. Lee
Attorney, Agent, or Firm—Rogers & Killeen

[57] ABSTRACT

A system and method for processing and transmitting video imagery. The system permits the operator of a video image system to selectively transmit desired portions of the video image at an operator selected resolution, operator selected compression level, and operator selected order of transmission of each of the portions. The system also includes a novel method of retransmitting blocks of data which have been erroneously transmitted and an automated retransmission protocol which retransmits data in a more robust manner where errors are detected in the first transmission of the data. Also disclosed in the system is a method of shading various portions of the video image to inform the system operator of which portions of the video image have been transmitted and a protocol for limiting the duration of and for altering the frequency of data transmissions to avoid detection and/or jamming by others.

36 Claims, 9 Drawing Sheets

| COMPRESSION | DATA TRANSMITTED |
|---|---|
| NONE | 15 30 90 89 95 97 97 97 93 90 76 74 |
| NARROW | 15 30 90 89 95 3* 97 93 90 76 74 (A) |
| MODERATE | 15 30 90 89 5* 96 90 76 74 (B) |
| FULL | 15 30 8* 93 76 74 (C) |

PRIORITIZED IMAGE TRANSMISSION SYSTEM AND METHOD

BACKGROUND OF THE INVENTION

The present invention relates generally to digital data processing and transmission techniques, and particularly to systems and methods for transmitting digital video images within limited bandwidths.

Presently, there are many systems in which video images are desired to be transmitted by means of electrical or electromagnetic signals. Examples of such transmitted video images are television, electronic photographs, facsimiles, video mapping, etc. Particularly when color video images are to be transmitted, the transmission system generally requires considerable bandwidth for the signal. While large bandwidth systems, such as a typical television transmission system, can often adequately transmit a video signal, a considerable amount of bandwidth is required, and the transmitting and receiving equipment must be relatively complex and expensive to process large bandwidth signals. Additionally, in military applications, large bandwidth transmissions are more readily detected and, therefore, more susceptible to jamming than more narrow band signals.

In many video image systems, a video image to be transmitted is divided into an array of picture elements or pixels. Each pixel represents the video image at one small point of the pixel array. In some systems, a pixel may be represented by a single digital bit, either a zero or a one, indicating either the presence or absence of white in the portion of the image represented by the pixel. In more sophisticated systems, each pixel is represented by plural digital bits which permit each pixel to have more than binary values of zero and one. For example, if four bits are used to represent a pixel then the pixel may have up to sixteen different values, generally ranging from white to black. Each increment from one to sixteen in the binary digits often represents a darker or lighter shade of gray transitioning from white to black. Finally, in color systems, each pixel may be represented by three sets of plural digital bits, each of the plural digital bits of a set representing the amount of one of the primary colors (red, blue or green) present at the portion of the visual image represented by the pixel. Such a scheme is often utilized in digitizing television images.

Because standard broadcast color television utilizes a video image which is 768 pixels wide and 512 pixels high, each screen image of a television contains approximately 393,000 pixels or approximately 9.4 million bits of digital data for a single screen image. While such large amounts of data can readily be sent by large bandwidth transmission and receiving equipment, it is often desired to send such digital video images by less expensive and more readily available low speed equipment such as HF (high frequency) radio and telephone voice lines. Such low speed devices typically operate at anywhere from 1200 to 9600 bits per second. If a single digital television image is sent via such a low speed transmission link, for example, a 2400 bps link, approximately 65 minutes would be needed to send a single image. In a tactical military situation, a transmission of such duration is usually desired to be avoided as such a long duration transmission could readily be detected and jammed. Moreover, such a long transmission time for each image would permit only a single image to be sent per hour.

Many of the known video image transmission systems transmit an entire screen of data. Often, however, only certain portions of the screen are of interest to the recipient of a signal and some portions of the image may be of more importance than others. In most known video signal transmission systems, no provision is made for transmission of only a selective portion of the video image or for transmission of different portions of the image at different resolutions.

While visual images in the form of television signals may be transmitted quite accurately by VHF equipment, VHF transmissions are generally limited to the line of sight between the transmitter and the receiver. Consequently, it is often desired to send television and other video image signals at other than VHF frequencies. For example, the use of signal carriers in the high frequency ("HF") range, i.e., 3,000 to 30,000 KHz, often permits worldwide communication between transmitter and receiver as the HF signal can be bounced or reflected off the ionosphere and back to earth. Conventional HF systems do not have sufficient bandwidth to send real time television signals, however.

It is accordingly an object of the present invention to provide a novel video image system and method whereby digital video images may be transmitted worldwide and/or through relatively low bandwidth transmission media.

It is a further object of the present invention to provide a novel system and method for video image transmission whereby selected portions of a video image may be transmitted to a receiver.

It is yet another object of the present invention to provide a novel video image system and method in which the resolution of the image to be transmitted may be controlled by the operator of the video system in accordance with the operator's interest in the contents of the video image.

It is still a further object of the present invention to provide a novel system and method of video image transmission whereby the portion of the image of most interest to the user is transmitted first.

It is still another object of the present invention to provide a novel video image system and method in which the operator of a video transmission system is made aware of the progress of the transmission of video image data.

It is still yet another object of the present invention to provide a novel video image system and method in which the time during which transmission takes place is limited to relatively small bursts and in which successive transmissions may be made at different transmission frequencies.

These and many other objects and advantages of the present invention will be apparent from the claims and from the detailed description of the preferred embodiments when read in conjunction with the appended drawings.

DETAILED DESCRIPTION OF THE PREFERRED EMBODIMENTS

Figure 1:
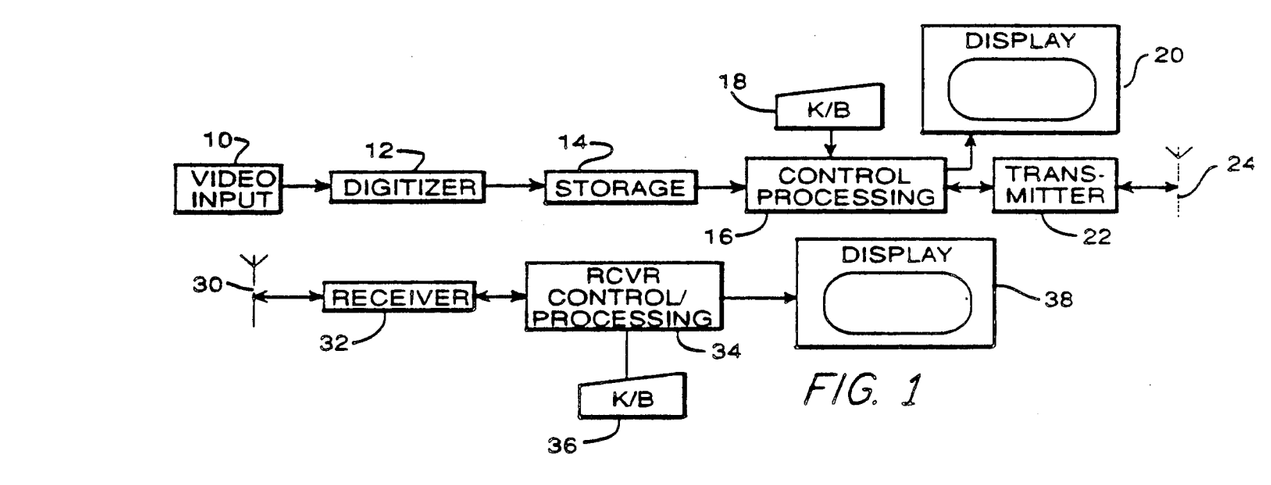
FIG. 1 is a functional block diagram of a video processing and transmission system which may use the system and method of the present invention.

With reference to FIG. 1, a video input device 10 may receive or generate a video signal in a conventional analog signal format in correspondence to a sensed visual image. The signal may be color encoded.

The analog signal from the video input device 10 may be digitized by a digitizer 12 which periodically produces a digital signal related to the gray level and/or the color of the video input signal. The digital signals produced by the digitizer 12 may be stored in a storage device 14 in an array which has reference to the position of each of the digital signals within the image being provided by the video input device 10. Accordingly, each of the digital signals may be considered a picture element, or pixel, relating the video image seen by the video input device 10 to a particular position within the entire video image and the digital storage array may be considered a digital map of the visual image. In a standard television signal, for example, the video input signal is often stored in an array which has 768 pixels horizontally and 512 pixels vertically. However, the exact number of pixels into which a visual image is divided is not significant to the present invention.

The pixels may be related to the gray level of the visual image, how white or how black the image is, and/or it may be related to the color of the image, i.e., how much of the colors red, green, and blue are detected by the detectors within the video input device 10.

Once the pixels are stored in the storage device 14, they may be acted upon by the control/processing unit 16 which is controlled by a keyboard 18. The video signal represented by the stored pixels, available to the control/processing unit 16, may be displayed in a monitor 20. Upon command by the operator of the control/processing unit 16, a signal which contains all or a portion of the visual image stored in the storage device 14 may be sent to a transmitter 22 to be transmitted to a remote device via a transmitter antenna 24. When the transmitted signal is received at a receiver antenna 30, it may be sent to a receiver 32 which removes any carrier signal or the like which may have been used during the transmission and provides the visual image signal to the receiver control/processing unit 34 which is, in turn, controlled by a keyboard 36, on which commands may be entered by the operator of the receiver portion of the system. Upon the command of the operator, the receiver control/processing unit 34 may provide the visual signal to the display unit 38.

The video input device 10 may be an conventional video input unit such as a black-and-white television camera, a color television camera, a facsimile machine, an optical scanner, or similar device which converts visual or optical imagery into an electrical or electromagnetic signal. The storage device 14 and control/processing unit 16 and 34 may be conventional computer or personal computer storage and control systems. The display monitors 20 and 38 may be conventional television monitors (black-and-white, monochrome, or color) or similar devices on which a visual image may be obtained from electronic signals.

The control/processing unit 16 provides the visual image data to the transmitter 22 which may transmit the data in a conventional format or in the novel format described hereinbelow. The receiver control/processing unit 34 and associated keyboard 36 may also be a conventional computer or personal computer and may include a volatile memory to temporarily hold visual image data and/or permanent storage device such as magnetic disks to save, for a longer term, selected desired visual images.

Figure 2:
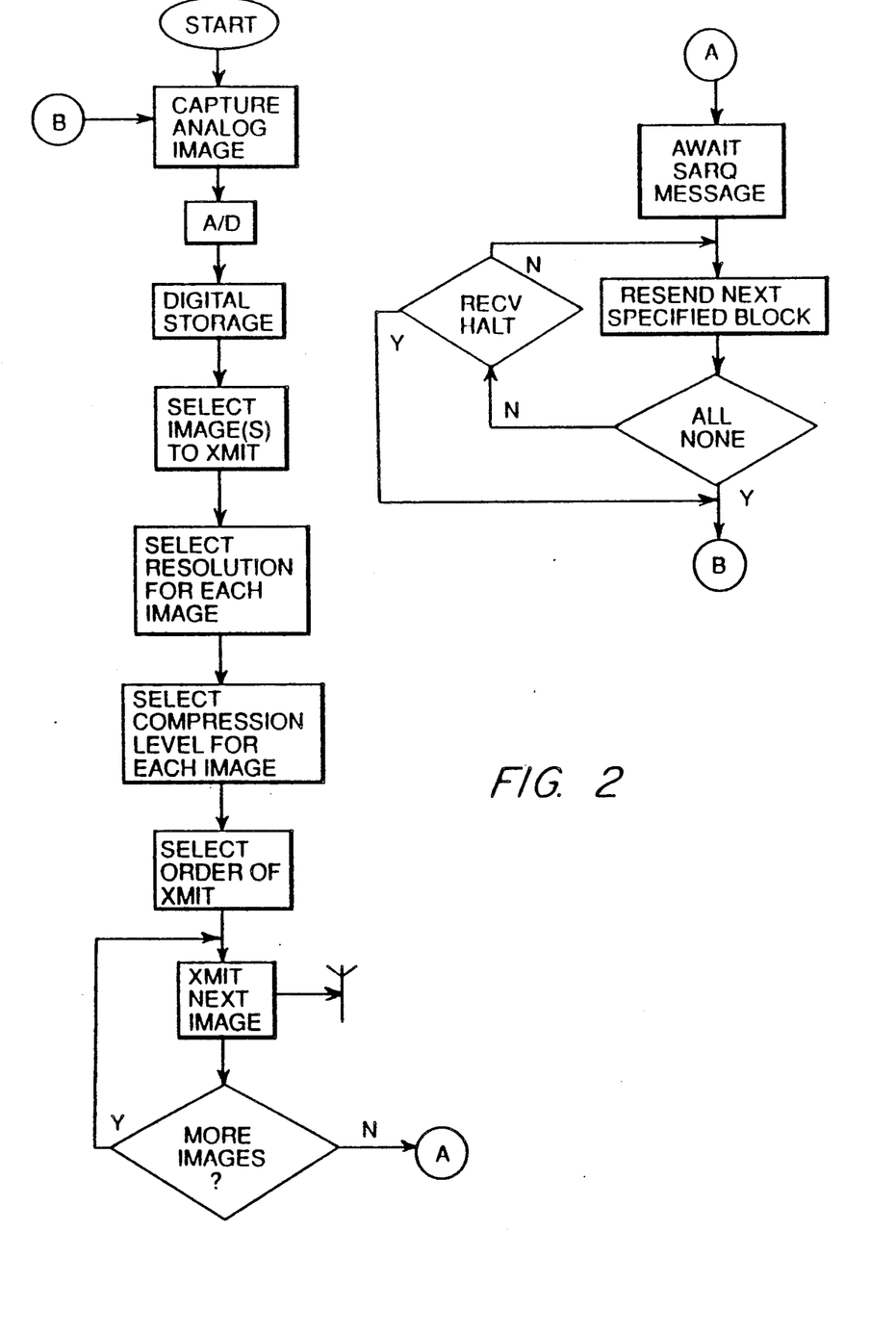
FIG. 2 is a flow diagram of one embodiment of the system and method of the present invention which may be utilized in the video image processing system of FIG. 1.

With reference to FIG. 1 and additional reference to FIG. 2, the visual image transmission and processing system and method of the present invention may utilize the steps depicted in the flow diagram of FIG. 2. At the start of the sequence, a visual image frame is captured by the video input device 10 and digitized through, for example, an analog-to-digital signal converter and placed into digital storage. The frame of visual data which has been stored may be a high resolution stillframe color image with the storage representing individual pixels of the image.

With continued reference to FIGS. 1 and 2, by controlling the keyboard 18, the user may specify one or more portions of the visual video image to transmit, or select to transmit the entire image. The operator of the system may select the resolution, compression level, and order of transmission (in the event more than one portion is desired to be sent) for each portion of the image which he desires to transmit. After the operator selects the one or more portions to be transmitted the control/processing unit 16 obtains the digital data from the storage unit 14 which correspond to the selected portions of the image. The digital data corresponding to the portions may then be processed by the control/processing 16 unit to reduce the resolution and to compress the image if such has been selected by the operator. The digital data corresponding to the selected portions may then be provided, in the order selected by the operator, to the transmitter for transmission to the receiver portion of the system. When the transmission of the digital data corresponding to the selected portions of the image is complete, the transmitting portion of the system awaits a selective reject/automatic repeat request ("SARQ") message from the receiving portion of the system. The SARQ message informs the transmitter portion of the system which blocks of data were received by the receiver 32 in error and requests that the transmitter resend the specified blocks of data. The transmitter may then resend the selected blocks until all of the selected blocks have been resent or until the receiver sends an abort message halting the retransmission of the data.

Figure 3A:
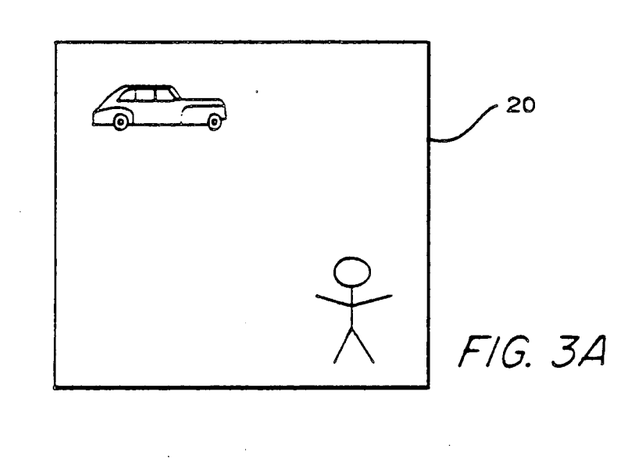
FIG. 3A-3D are diagrammatic illustrations of the operation of the system of FIG. 2.

A method by which the operator of the transmitter portion of the system may select which portions of the visual image to transmit is illustrated in FIGS. 3A-3D. With reference to FIG. 3A, a visual image may have portions which are of more interest to the operator of the system than other portions of the image. At the command of the operator, the control/processing unit 16 may display on the monitor 20 the visual image as depicted in FIG. 3A. Upon a further command of the operator, the control/processing unit 16 may provide a grid overlay on the visual image of FIG. 3A to produce the overlay image shown in FIG. 3B. Through use of conventional input devices such as a keyboard 18, a joystick, or mouse, etc., the operator of the system may then specify a specific block or specific location within the grid which is of particular interest to the operator for transmission. The block or location is herein called the "interest center" and will normally be transmitted first by the control/processing unit 16.

Figure 3B:
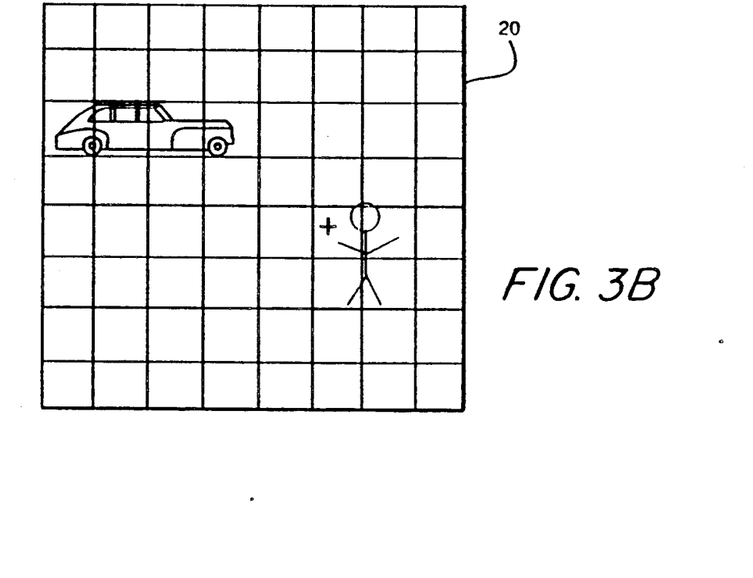
Figure 3C:
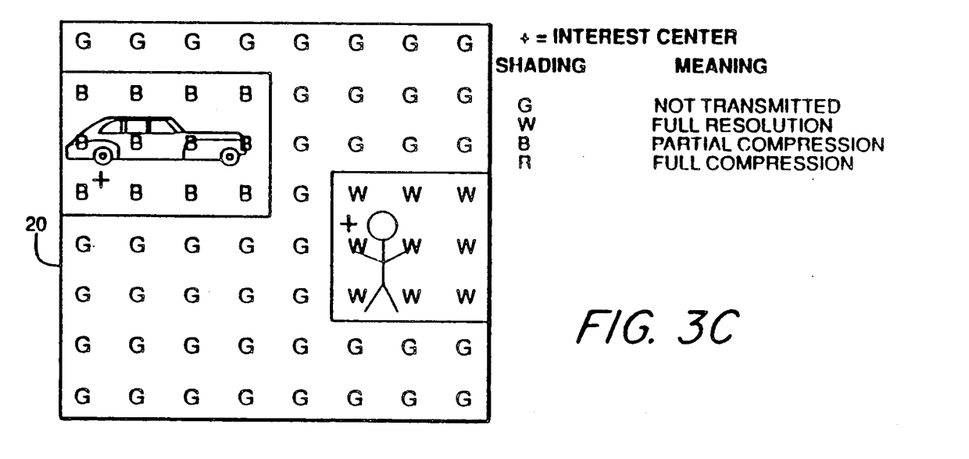

With continued reference to FIG. 3B, the plus sign ("+") indicates the block which the operator has selected as his interest center in this example. Once the interest center has been selected, the operator may then specify the entire portion of the image which is to be sent in association with the specified interest center, i.e., the operator may specify the "borders" of the portion to be transmitted. As shown in FIG. 3C, the operator may, for example, select a square portion of the image which best illustrates the "man" and nearby background depicted in the visual image. To assist the operator in selecting the portion of the screen, the control/processing unit 16 may construct overlays on the screen which define for the operator what portions of the screen he has selected. Such definition could be provided by shading the visual image with particular colors or particular hues to indicate the selected portion. With reference to the visual image of the man shown in FIG. 3C, the code W indicates the portion of the visual image which has been selected by the operator for transmission.

With continued reference to FIGS. 3B and 3C, the operator may continue to select other portions of the visual image such as the selection of the "vehicle" illustrated in FIGS. 3B and 3C. The code "B" in FIG. 3C indicates the portion of the visual image which has been selected by the operator to send the interest center related to the vehicle.

As a part of selecting the interest center and portions of the visual image to be transmitted, the system of the present invention permits the operator to specify both the resolution and whether compression should be utilized in transmitting each of the portions of the visual image. To remind the operator what portions of the visual image have been selected and what resolution and compression levels have been selected, the system of the present invention may key the shading which is used on the monitor to specify the portion to be transmitted in a scheme known to the operator.

Figure 3D:
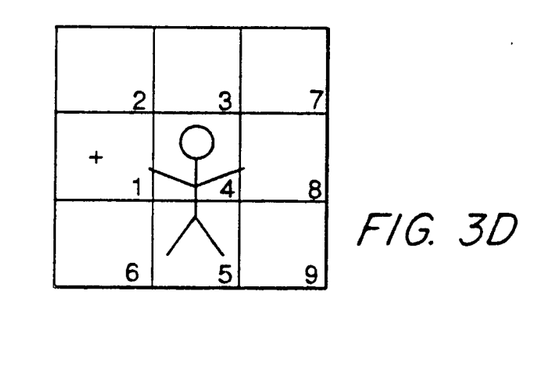

With reference to FIG. 3D, the selected portion of the visual image around the "man" of FIG. 3A is illustrated in greater detail. Each of the blocks of the visual image has been numbered for purposes of explanation one to nine. In the system of the present invention, the data may be sent in blocks of a predetermined size, for example, 64 pixels by 64 pixels. The block which the operator has specified is the interest center (labeled "1" in FIG. 3D) may be sent first and then the blocks adjacent to the interest center may be sent. The process may be continued radially outwardly until all blocks of the selected portion of the picture have been transmitted. In the example shown in FIG. 3D, the blocks may be sent in the order of their illustrative numbering, 1, 2, 3, . . . 9. By the use of this procedure, the portion of the visual image which the operator has determined to be the most significant is sent first. When the receiver is receiving the visual image, the operator of the receiver may determine that partially through the transmission he has received sufficient data and command the system to go to the next interest center. In this way, transmission time is kept to a minimum and the information of most importance is transmitted with priority.

When the operator of the system of the present invention selects more than one portion of an image (which may be unrelated and on nonconnecting portions of the screen), the operator also selects which image portion will be transmitted first, second third, etc. Once this selection process is made, the control/processing unit may transmit each selected image portion from the interest center of the image out to the selected border of each image portion. This process continues until all selected image portions are completely transmitted or until the transmission is otherwise ended.

Figure 4:
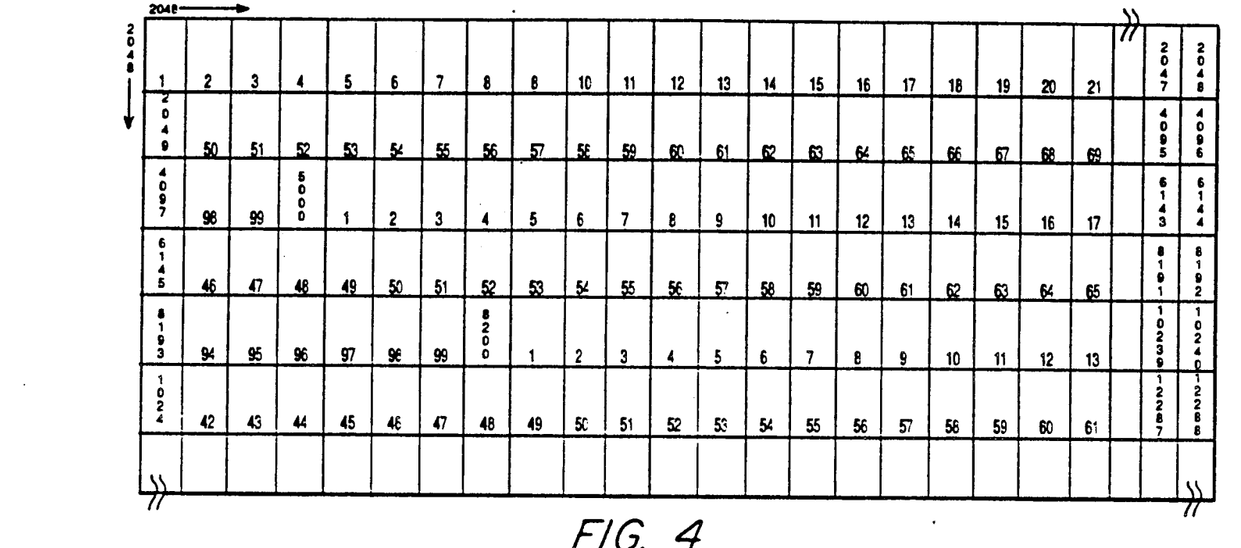
FIG. 4 is a diagram of a digital storage map of a video image illustrating methods of varying pictorial resolution in the system of FIG. 2.

With reference to FIG. 4, one method of varying the resolution in a system of the present invention may be illustrated in the digital storage map depicted in FIG. 4. A system of the present invention may digitize the input video signal into a video map having 2,048 pixels in both the horizontal and vertical directions, as partially illustrated in the visual map of FIG. 4. The numbers within each of the cells of FIG. 4 represent the serial position of the pixel within the storage map, it being understood that at each of the numbered locations of the storage map, (i.e., cells) the digital value associated with a particular pixel is stored. To transmit a digital image at full resolution, the pixels from each of the storage map locations may be transmitted in turn. Such a procedure ensures that all granularity of the digital data is retained, however at a cost of sending a very large block of data. For example, in the 2048×2048 system illustrated in FIG. 4, approximately 4.2 million pixels would be transmitted.

To reduce the transmission time, various methods may be utilized to either combine the data in a predetermined manner or to not transmit certain portions of the data. When the combined data is received at the receiver portion of the system, the receiver control/processing unit constructs the image based upon the received data and the resolution technique used prior to transmission. For example, a simple method would be merely to transmit every other pixel, i.e., transmitting pixels 1, 3, 5, 7, 9, . . . 2049, 2051, . . . 8193, . . . . Alternatively, groups of pixels could be combined in a type of averaging. For example, pixels 1, 2, 3, and 4 could be averaged and the average value of the pixel transmitted, for a 75% reduction in number of pixels which need to be transmitted. Similarly, pixels 6145, 6146, 6147, and 6148 and 8197, 8198, 8199, and 8200 may be combined and a single "representative" pixel value transmitted. Obviously, many different schemes can be used to attempt to reduce the number of pixels which are transmitted and yet maintain picture granularity as high as possible, including averaging in both the horizontal and vertical directions, etc.

In the system of the present invention, the operator can specify which of a large number of resolution techniques and levels should be utilized depending upon the transmission protocol, the noise levels on the transmission channels, and the images being transmitted.

Figure 5:
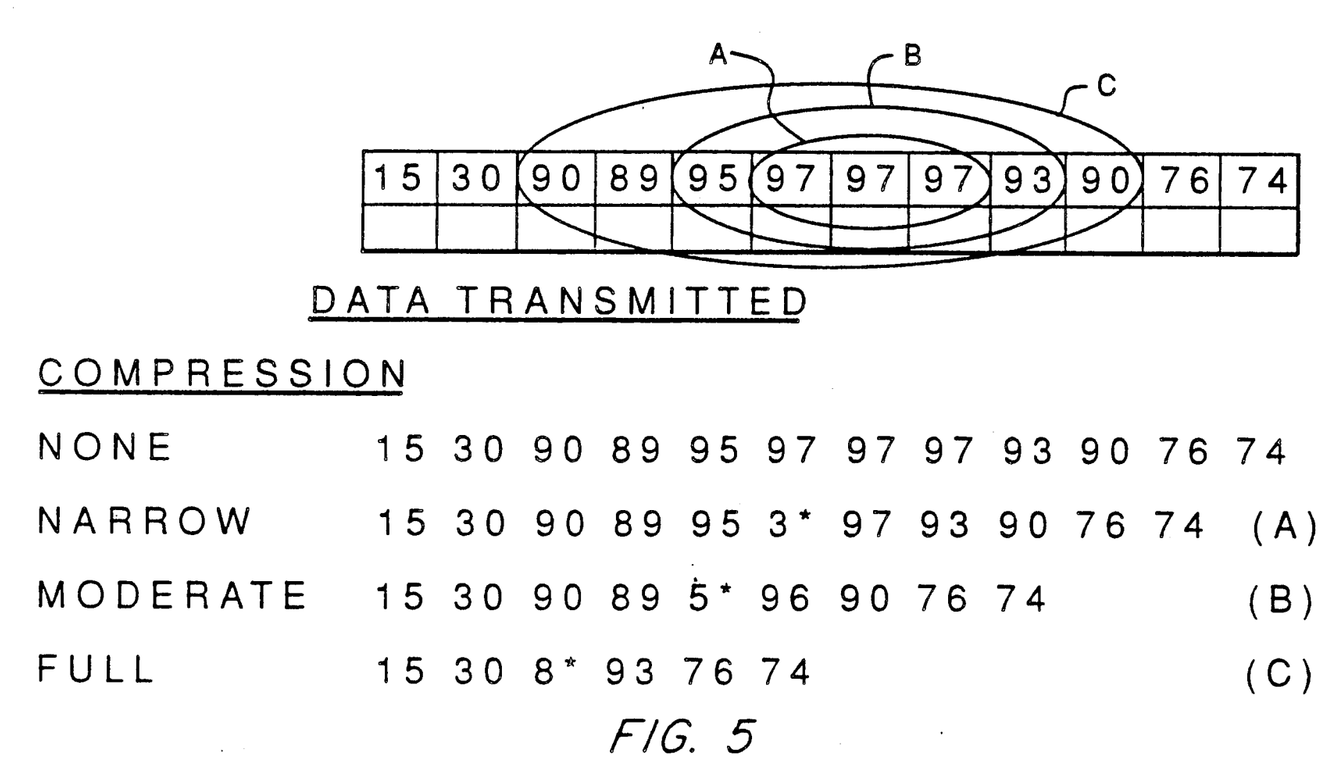
FIG. 5 is a pictorial diagram of a block of video data to be transmitted in the system of FIG. 2, illustrating varying levels of compression.

In addition to techniques which reduce the resolution of the data and correspondingly reduce the amount of data which need to be transmitted, the system of the present invention also enables the operator to select varying levels of compression of the data. The data may be compressed in any conventional data compression technique. The following technique is illustrative of the types of compression techniques which may be utilized to further reduce the amount of data which must be transmitted. With reference to FIG. 5, assume that the numbers shown in the block of the top of the figure represent the digital value of a series of pixels to be transmitted. A review of the values of the pixels shows that in the middle of the series of pixels, the values of the pixels are fairly close to each other. This is not an uncommon occurrence in visual images as most images have many large portions in which the color does not change significantly portions of the image, i.e., the sky may be a fairly constant color across the top of an outdoor scene. Rather than transmit small changes in the value of the pixels, a coding scheme may be used such that if adjacent pixels do not change by more than a prespecified amount, the subsequent pixels are not sent but a multiplier is indicated in association with a determined pixel value.

For example, with reference to the pixel values in FIG. 5, if no compression is utilized, the data which is transmitted is shown in the first row of the "Data Transmitted" table and it corresponds to the value of each of the pixels. Compression can be selected to be narrow, moderate or full or variations thereof depending on the granularity of the picture which the operator is willing to accept. If, for example, a narrow compression is specified, only pixels having values very close to each are combined. In the pixel series of FIG. 5, the middle pixels all have the value of 97. Accordingly, the data which is transmitted may include a special character, for example the asterisk of line A of FIG. 5 and a multiplier, i.e., the numeral 3 before the asterisk, to indicate to the receiving system that the next three pixels are all 97, even though only one of the pixels is being transmitted.

If a moderate compression is selected, for example, pixels having a value within a particular range of each other, i.e., within five units, for example, may all be compressed into a single unit which is the average of the selected pixels. The "average" pixel is transmitted along with a multiplier to indicate the number of consecutive pixels represented by the "average". In the data sequence depicted in FIG. 5, the pixels having a value of 95, 97, 97, 97, 93, all appear in sequence and are within five units of each other and therefore may be compressed into a single unit having the average value of 96 and a multiplier character indicating five pixels of that value (as shown on line B).

In the final line ("C") of FIG. 5 is exemplified a more severe compression in which all adjacent pixels having values within eight of each other may be compressed. Note that at the transmission of line C, the number of digital numbers which must be actually transmitted is about half as many when compared to a no compression transmission. However, some granularity of the picture has been lost as an average value of 93 units is transmitted instead of the actual values which vary from 89 to 97 units. Using combinations of resolution reduction and compression techniques, visual images have been successfully communicated by the transmission of only five percent of the digital video data.

The foregoing is only illustrative of the many different kinds of compression techniques which can be utilized. Such other compression techniques may not be restricted merely to adjacent horizontal pixels but may take into account both horizontal and vertical proximity of the image represented by the pixels. Again, in the system of the present invention, the operator is able to select a compression level prior to transmission so that data is transmitted for a minimal amount of time.

Figure 6:
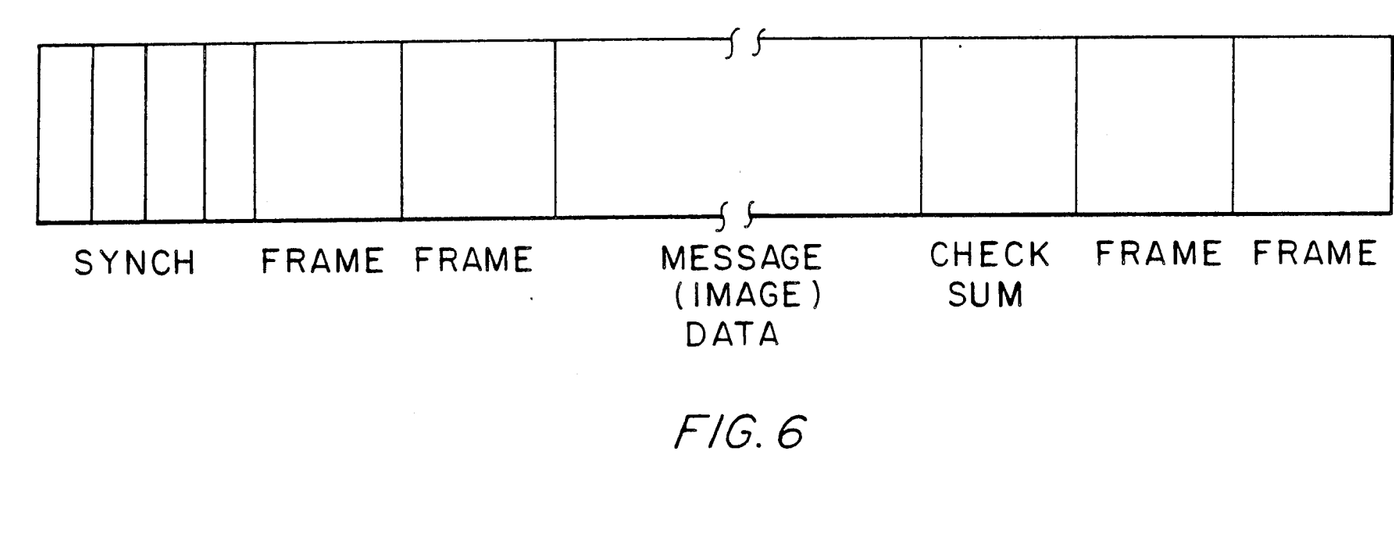
FIG. 6 is a diagrammatic illustration of the format of a data block which may be utilized in the system of FIG. 2.

Messages containing visual image data and/or control information may be sent in accordance with the message format depicted in FIG. 6. The first few blocks of FIG. 6 indicate a transmission of synchronization characters followed by one or more frame characters. Both the synchronization and frame characters are used by the transmission and receiving portions of the system to ensure that the data are correctly aligned in time. The image and/or control data may be contained in a message in a block of variable length. A check sum, which may follow the image data, may be a linear check sum, circular check sum, or any conventional data integrity assurance technique. After the check sum, further framing information may be sent to ensure data integrity. Conventional forward error correction data within the image data message may also be included so that a certain number of transmission errors may be tolerated and resolved by the receiving portion of the system.

When a visual image or portions of images are transmitted by the transmitter of FIG. 1 and received by the receiver of FIG. 1 in the form of multiple message blocks, the blocks are checked by the receiver for integrity. An image portion may comprise several blocks of data of fixed or variable length and each block may consist of multiple data segments or "packets". The receiving unit automatically records the identification number of any data messages which are transmitted incorrectly. The transmission of the blocks proceeds sequentially until all the blocks are sent. Each data block is numbered according to its position within the message. Once the transmission is initiated, the entire data message, (such as an image or image portion) is transmitted. As each block is received it is checked for data integrity by comparing it against its check sum. Those blocks found to be in error, are recorded by the receiving terminal on a listing of bad blocks which must be sent by the transmitting terminal. Upon the completion of the image transmission, the receiver unit may transmit a message back to the transmitting unit informing it of the identity of the data blocks which are incorrect and impliedly or expressly requesting retransmission of the data blocks. In the system of the present invention, the operator of the receiving portion may override this automatic resend request if the receiving operator is satisfied with the quality of the visual image which he has received.

This error elimination process can continue until the image is totally correct, until it is manually aborted, or until a predetermined number of cycles has been achieved. Because the receiving operator may cancel the retransmission of bad blocks, the system helps to avoid detection in a military environment by reducing the amount of time during which the messages must be transmitted.

As the images or portions of images are being sent from the transmitting terminal to the receiving terminal, the data blocks which are and have been sent may be shaded, highlighted, or boxed on the transmitting unit's monitor for the information of the operator. This technique provides a visual que to the unit operator to decide when the abort or stop a transmission of an image.

Figure 7:
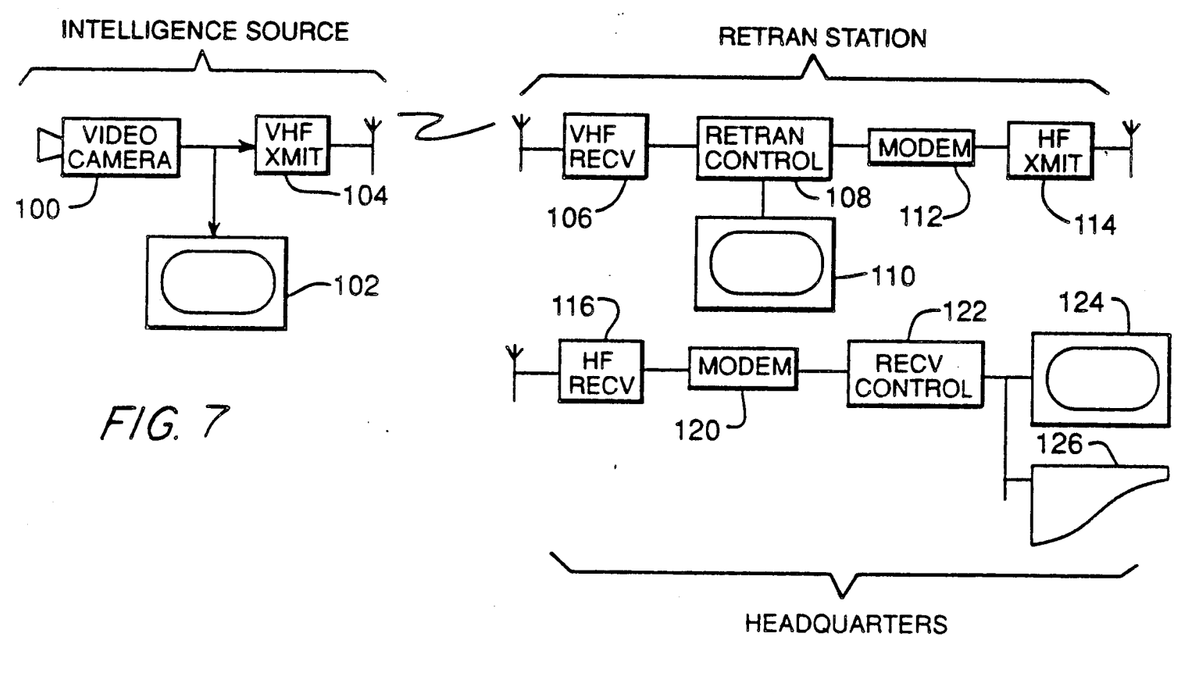
FIG. 7 is a functional block diagram of an intelligence gathering system which utilizes the system of the present invention.

With reference to FIG. 7, the video image processing and transmission system may be embodied in an intelligence system in which an intelligence source operates a video imagery device such as a video camera 100. The operation of the video camera is monitored by a display device 102 accessible to the operator of the intelligence source. The signal obtained from the video camera may be transmitted through a conventional VHF transmission system to a line of sight receiver. Such a system is readably adaptable to military aircraft to which a high resolution television camera is attached and utilized for reconnaissance purposes.

Because the intelligence source may not be within line of sight distance of the desired recipient of the visual information, the VHF transmission may be received by a retransmission station located within the line of sight of the intelligence source. Upon receipt of the transmission the VHF by receiver 106, the signal is applied to the retransmission control station 108 which contains the digitizer, storage unit, and control/processing unit of the present invention. When the retransmission control operator has determined which portions of the received signal to retransmit to the headquarters, the selected digital video signals are sent, as described above, through a modem to a high frequency transmission unit 114. Because the signal being sent by the retransmission station is sent with a high frequency, the signal may be sent far beyond the line of sight distance. When received by HF receiver 116 at the headquarters' unit, the signal may be demodulated by the modem 120 and displayed on a monitor 124, or hard copy production device 126 under control of the receiving control/processing unit 122. In a specific embodiment, many remote intelligent sources can be each transmitting to plural retransmission stations which in turn are each retransmitting the selected video signals to the headquarters location. In this way, a field commander can obtain visual imagery of various aspects of a military deployment in numerous remote locations in near real time.

The system of the present invention may be used in a wide variety of visual communication systems, particularly (although not necessarily) when some portions of the communication system are not within the line-of-sight of other portions. One of the advantages of a system of the present invention is the ability to use relatively narrow-bandwidth communication devices (such as telephone lines, HF radio links, optical cable, etc.) in the transmission of visual imagery without the consumption of inordinate periods of time. The adaptability of the selective image portion transmission method generally reduces the amount of time needed to transmit visual images of interest and reduces the need to transmit detailed imagery of little concern to the user in order to obtain detailed imagery of great concern to the user.

The system of the present invention may readily be utilized within the large, existing network of low speed communications, such as the vast telephone systems and within the bandwidth limits of existing communications equipment such as modems and HF radio links.

Whenever it is desired to avoid eavesdropping, or in military environments to avoid detection and/or jamming, it is often desired to limit the amount of time during which a system is actively broadcasting. In a system of the present invention, detection and jamming may be avoided by breaking the message blocks into smaller units or packets, and transmitting each packet at a differing frequency after a random delay time between the transmission of successive packets. In a system of the present invention, the transmitting unit may initiate the transmission of a visual image by transmitting a portion of the image as well as set of control data to the receiving terminal. The control data includes the time of the next transmission, the length of the next transmission (or image) and the transmitting frequency of the next transmission. At the conclusion of the transmission of the message, the control data may include a reply frequency and time. By examining the control data, the receiver can be automatically set to transfer to the assigned frequency at the predetermined time to receive the next portion of the image.

Figure 8:
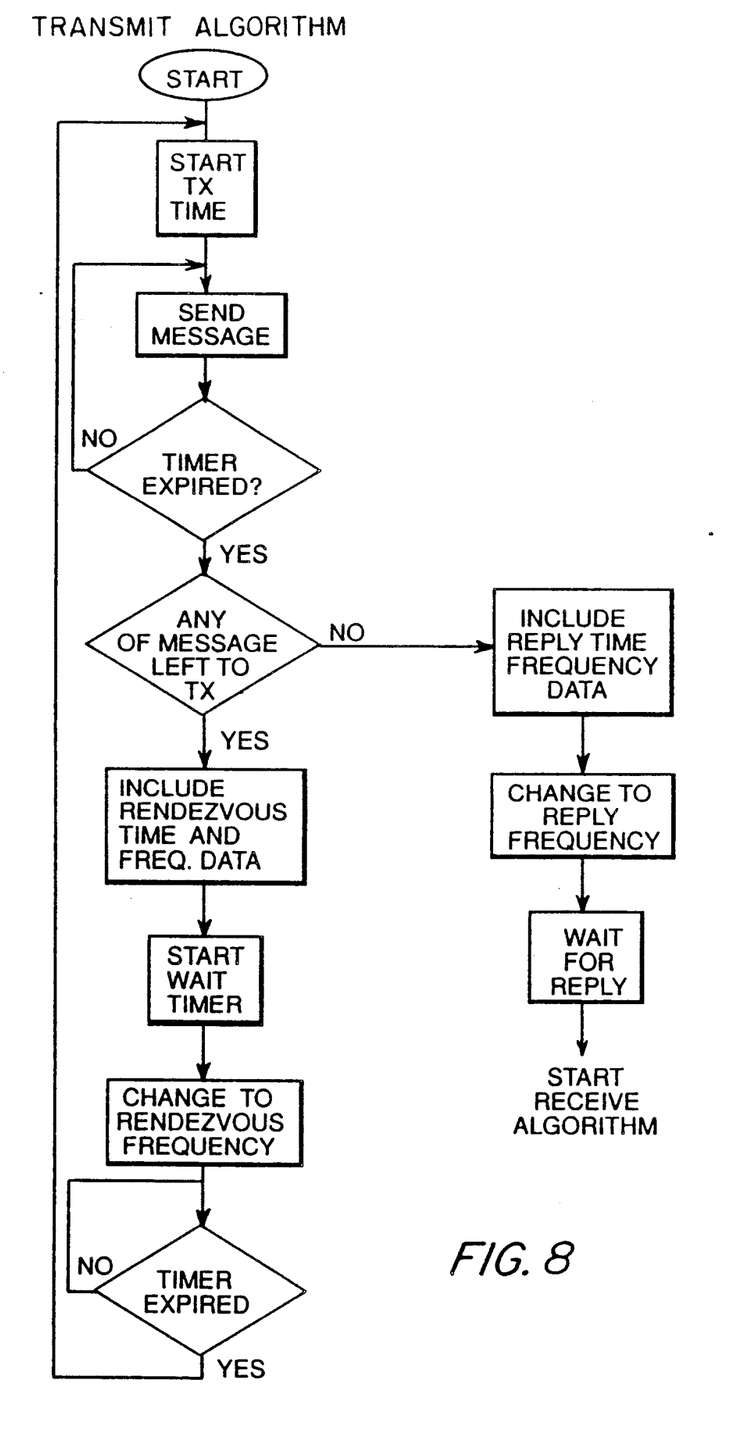
FIG. 8 is a flow diagram of a method of transmitting data which may be utilized by the system of FIG. 2.

With reference to FIG. 8, a transmitting unit in the system of the present invention may utilize the method depicted in the flow diagram of FIG. 8. When the transmitting unit determines to transmit a message, the message is generally divided into multiple blocks of data. The first block of data is transmitted to the receiving unit on a previously specified frequency. If more blocks are to be sent, the transmission unit also sends a rendezvous time and frequency to the receiving units. While waiting for the determined rendezvous time, the transmitting may change to the rendezvous frequency so that it is prepared to transmit immediately upon the arrival of the rendezvous time. The transmission of messages at different rendezvous times and frequencies is continued until all of the message is sent, at which time the transmitting unit, in place of the rendezvous time and frequency, includes a reply time and frequency in its message to the receiving unit. Upon transmitting the reply time and frequency data, the transmitting units returns to the reply frequency and waits for the reply, which will identify bad blocks which are to be resent, if any. If a reply is received, the transmitting unit becomes the receiving unit and may use the receiving method illustrated in FIG. 9, below.

Figure 9:
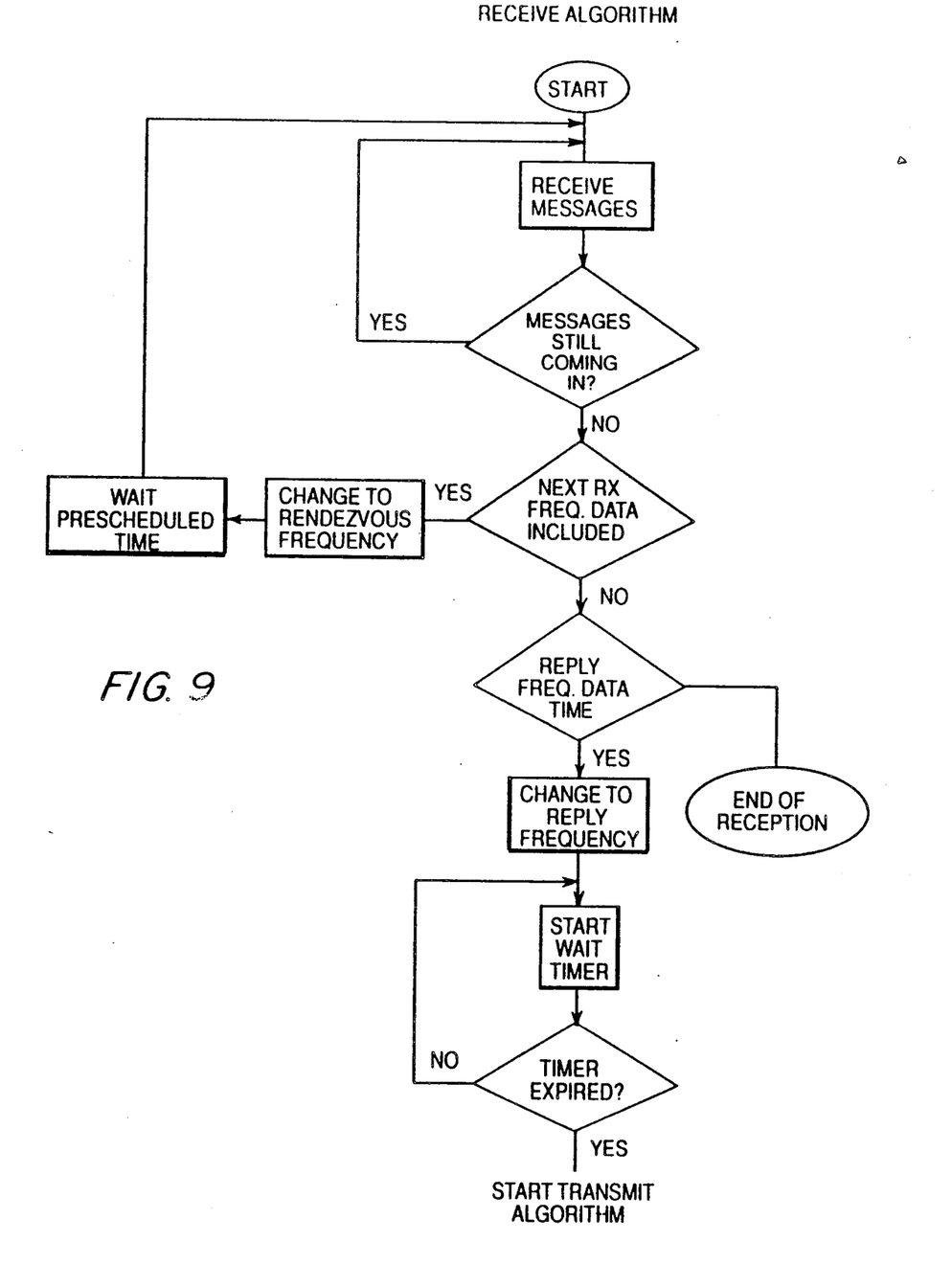
FIG. 9 is a flow diagram of a method of receiving data which may be utilized by the system of FIG. 2.

With reference to FIG. 9, the receiving unit upon reception of a portion of a message captures the portion of the message until the end of the message. Upon receiving the message portion, the message portion is checked to determine whether a rendezvous frequency and time have been included. If a rendezvous frequency and time have been included, the receiving units retunes its radio to the rendezvous frequency, and waits the amount of time until the rendezvous is scheduled at which point it again receives data on the rendezvous frequency. At the completion of the message, the transmitting unit will have sent a reply frequency and rendezvous time to which the receiving unit may retune and, upon the expiration of the specified time, transmit to the transmitting unit the identification of bad blocks or packets that are to be resent.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

We claim:

1. Method for transmitting one or more portions of a digital image comprising the steps of:

(a) separating said digital image into blocks of digital data representing the image;

(b) selecting one or more groups of said blocks to be transmitted;

(c) selectively reducing the resolution of each of said groups to be transmitted whereby each of said blocks in each of said reduced resolution groups contains less digital data;

(d) selectively compressing the digital data in each of said groups to be transmitted whereby each of said blocks in each of said compressed groups contains less digital data;

(e) designating an order of transmission of each of said groups independent of their selection; and (f) transmitting each of said groups responsive to said steps (b)–(e).

2. The method as defined in claim 1 further comprising the step of defining the first said block of digital data to be transmitted in each of said groups, and wherein said step of transmitting further comprises the steps of transmitting said first block first in each of said groups, and of transmitting the remaining of said blocks in each of said groups in order of proximity to said first block.

3. The method as defined in claim 1 wherein said step of transmitting further comprises the step of transmitting on a narrow band communications channel.

4. Method for transmitting an image represented by digital data comprising the steps of:

(a) defining blocks to be transmitted, each of said blocks comprising digital data representing a portion of said image;

(b) designating a first of said blocks to be transmitted;

(c) designating an order of transmission of the other said blocks based on proximity to said first block; and (d) transmitting said blocks responsive to steps (b) and (c).

5. The method as defined in claim 4 further comprising the step of selectively adjusting the resolution of each of said blocks before transmitting said blocks.

6. The method as define in claim 4 further comprising the step of selectively adjusting the compression of each of said blocks before transmitting said blocks.

7. The method as defined in claim 4 further comprising the steps of indicating said blocks to be transmitted on a monitor and indicating completion of transmission of said blocks on said monitor.

8. The method as defined in claim 4 further comprising the steps of:

(a) providing first check sums for said blocks of digital data to be transmitted;

(b) transmitting said first check sums with corresponding said blocks;

(c) receiving said blocks and said check sums;

(d) calculating second check sums for receiving said blocks;

(e) comparing corresponding said first and second check sums;

(f) identifying said blocks in which said first and second check sums are not the same; and (g) retransmitting only identified ones of said blocks after said blocks have been transmitted.

9. The method as defined in claim 4 wherein said step of transmitting comprises the step of transmitting on a narrow band communication channel.

10. A method for selectively transmitting one or more portions of a high resolution image depicted by digital data comprising the steps of:

(a) establishing on said image a matrix of blocks containing digital data;

(b) selecting one or more interest centers on said image, wherein each said interest center comprises one of said blocks representing a focal point of a portion of said image to be transmitted;

(c) selecting a group of said blocks proximate to and including one said interest center, wherein each said group represents a portion of said image to be transmitted;

(d) selectively compressing each said groups whereby each of said blocks in each said compressed group contains less digital data;

(e) selectively reducing said high resolution for each said groups whereby each of said blocks in each said reduced resolution group contains less digital data;

(f) selectively assigning an order of transmission for each said group; and (g) transmitting each said group, wherein said interest center is transmitted first in each said transmitted group and the remaining said blocks in each said transmitted group are transmitted in order of proximity to said interest center.

11. The method as defined in claim 10 wherein said step of transmitting further comprises the step of transmitting on a narrow band communication channel.

12. A method of transmitting and receiving digital data representing an image comprising the steps of:

(a) defining blocks of said data representing portions of said image;

(b) providing first check sums for said blocks of data;

(c) transmitting said blocks of data and said first check sums;

(d) receiving said blocks of data and said check sums without acknowledging receipt after each block is received;

(e) calculating second check sums for received said blocks of data;

(f) comparing corresponding said first and second check sums;

(g) identifying said blocks of data in which said first and second check sums are not the same; and (h) selectively retransmitting said blocks of data identified in step (g) after step (c) is completed.

13. A method of transmitting and receiving digital data representing an image comprising the steps of:

(a) defining blocks of said data representing portions of said image;

(b) establishing subblocks of said data within said blocks;

(c) providing first check sums for said subblocks;

(d) transmitting said blocks of data and said first check sums;

(e) receiving said blocks and said first check sums without acknowledging receipt after each said block is received;

(f) calculating second check sums for received said subblocks;

(g) comparing corresponding said first and second check sums;

(h) identifying said subblocks of data in which said first and second check sums are not the same; and (i) retransmitting said subblocks of data identified in step (g) after step (c) is completed.

14. In a method for transmitting digital data representing a high resolution image on a high frequency carrier, the improvement comprising the steps of:

(a) separating said digital image into blocks of digital data representing the image;

(b) selecting one or more groups of said blocks to be transmitted;

(c) selectively reducing the resolution of each of said groups to be transmitted whereby each of said blocks in each of said reduced resolution groups contains less digital data;

(d) selectively compressing the digital data in each of said groups to be transmitted whereby each of said blocks in each of said compressed groups contains less digital data;

(e) defining the first said block of digital data to be transmitted in each of said groups; and (f) on said high frequency carrier, transmitting said first block first in each of said groups, and transmitting the remaining of said blocks in each of said groups in order or proximity to said first block.

15. A method for transmitting one or more portions of a digital image displayed on a monitor comprising the steps of:

(a) defining blocks of digital data representing parts of said image;

(b) selecting for transmission one or more groups of said blocks;

(c) displaying said groups and said blocks in said groups on said monitor;

(d) transmitting said groups; and (e) indicating on said monitor the transmission of each of said blocks in said groups after transmission of each of said blocks.

16. A method of transmitting and receiving digital data representing an image comprising the steps of:

(a) defining one or more portions of said image to be transmitted;

(b) transmitting a first random length part of a first portion of said image;

(c) transmitting remaining random length parts of said first portion and of the other said portions at random intervals and on random frequencies; and (d) instructing a receiver to receive said other portions at corresponding said intervals and said frequencies.

17. A system for transmitting a portion of an image represented by digital data comprising:

(a) means for separating said image into blocks of digital data;

(b) means for selecting for transmission one or more groups of said blocks;

(c) means for selectively reducing the resolution of each of said groups to be transmitted, whereby each of said groups contains less digital data;

(d) means for selectively compressing digital data in each of said groups to be transmitted, whereby each of said groups contains less digital data;

(e) means for designating an order of transmission of said groups independent of their selection; and (f) means for transmitting said groups.

18. The system as defined in claim 17 further comprising means for selectively designating one said block to be transmitted first in each of said groups.

19. The system as defined in claim 17 wherein said means for transmitting comprises means for transmitting said designated block first and then transmitting the remainder of said blocks in order of proximity to said designated block.

20. The system as defined in claim 17 wherein said means for transmitting comprises means for transmitting on a narrow band communications channel.

21. A system for transmitting an image represented by digital data comprising:

(a) means defining blocks to be transmitted, each of said blocks comprising digital data representing a portion of said image;

(b) means for selectively designating a first of said blocks to be transmitted;

(c) means for designating an order of transmission of the other said blocks based on proximity to said first block; and (d) means for transmitting said blocks.

22. The system as defined in claim 21 further comprising means for selectively adjusting the resolution of each of said blocks before transmitting said blocks.

23. The system as defined in claim 21 further comprising means for selectively adjusting the compression of each of said blocks.

24. The system as defined in claim 21 further comprising a monitor means for indicating said blocks to be transmitted on said monitor, and mans for indicating completion of transmission of said blocks on said monitor.

25. The system as defined in claim 21 further comprising:

(a) means for providing first check sums for said blocks of digital data to be transmitted;

(b) means for transmitting said first check sums with corresponding said blocks;

(c) means for receiving said blocks and said check sums;

(d) means for calculating second check sums for receiving said blocks;

(e) means for comparing corresponding said first and second check sums;

(f) means for identifying said blocks in which said first and second check sums are not the same; and (g) means for retransmitting only identified ones of said blocks after said blocks have been transmitted.

26. The system as defined in claim 21 wherein said means for transmitting comprises means for transmitting on a narrow band communication channel.

27. A system for selectively transmitting one or more portions of a high resolution image depicted by digital data comprising:

(a) means for establishing on said image a matrix of blocks containing digital data;

(b) means for selecting one or more interest centers on said image, wherein each said interest center comprises one of said blocks representing a focal point of a portion of said image to be transmitted;

(c) means for selecting a group of said blocks proximate to and including one said interest center, wherein each said group represents a portion of said image to be transmitted;

(d) means for selectively compressing each said groups whereby each of said blocks in each said compressed group contains less digital data;

(e) means for selectively reducing said high resolution for each said groups whereby each of said blocks in each said reduced resolution group contains less digital data;

(f) means for selectively assigning an order of transmission for each said group; and (g) means for transmitting each said group, wherein said interest center is transmitted first in each said transmitted group and the remaining said blocks in each said transmitted group are transmitted in order of proximity to said interest center.

28. The system as defined in claim 27 wherein said means for transmitting further comprises means for transmitting on a narrow band communication channel.

29. A system of transmitting and receiving digital data representing an image comprising:
   (a) means for defining blocks of said data representing portions of said image;
   (b) means for providing first check sums for said blocks of data;
   (c) means for transmitting said blocks of data and said first check sums;
   (d) means for receiving said blocks of data and said check sums without acknowledging receipt after each block is received;
   (e) means for calculating second check sums for received said blocks of data;
   (f) means for comparing corresponding said first and second check sums;
   (g) means for identifying said blocks of data in which said first and second check sums are not the same; and
   (h) means for selectively retransmitting said blocks of data identified by said means for identifying.

30. A system of transmitting and receiving digital data representing an image comprising:
   (a) means for defining blocks of said data representing portions of said image;
   (b) means for establishing subblocks of said data within said blocks;
   (c) means for providing first check sums for said subblocks;
   (d) means for transmitting said blocks of data and said first check sums;
   (e) means for receiving said blocks and said first check sums without acknowledging receipt after each said block is received;
   (f) means for calculating second check sums for received said subblocks;
   (g) means for comparing corresponding said first and second check sums;
   (h) means for identifying said subblocks of data in which said first and second check sums are not the same; and
   (i) means for selectively transmitting said subblocks of data identified by said means for identifying.

31. In a system for transmitting digital data representing a high resolution image on a high frequency carrier, the improvement comprising the steps of:
   (a) means for separating said digital image into blocks of digital data representing said image;
   (b) means for selecting one or more groups of said blocks to be transmitted;
   (c) means for selectively reducing the resolution of each of said groups to be transmitted whereby each of said blocks in each of said reduced resolution groups contains less digital data;
   (d) means for selectively compressing the digital data in each of said groups to be transmitted whereby each of said blocks in each of said compressed groups contains less digital data;
   (e) means for defining the first said block of digital data to be transmitted in each of said groups; and
   (f) means for transmitting on said high frequency carrier, said first block first in each of said groups, and the remaining of said blocks in each of said groups in order or proximity to said first block.

32. A system for transmitting one or more portions of a digital image displayed on a monitor comprising the steps of:
   (a) means for defining blocks of digital data representing parts of said image;
   (b) means for selecting for transmission one or more groups of said blocks;
   (c) means for displaying said groups and said blocks in said groups on said monitor;
   (d) means for transmitting said groups; and
   (e) means for indicating on said monitor the transmission of each of said blocks in said groups after transmission of each of said blocks.

33. A method of transmitting a visual image, comprising the steps of:
   (a) digitizing the visual image into a series of digital signals;
   (b) transmitting on a specified frequency a portion of the series of digital signals and signals indicating a new specified frequency and a rendezvous time;
   (c) waiting until the rendezvous time;
   (d) repeating steps (b) and (c) until all of the image has been transmitted;

34. The method of claim 33, further comprising the steps of:
   (e) transmitting signals indicating a reply frequency and a reply time;
   (f) waiting until all the arrival of the reply time; and
   (g) receiving a signal on the reply frequency identifying portions of the series of digital signals which were received in error.

35. The method of claim 34 further comprising the steps of:
   (h) repeating steps (b) and (c) for the identified in error portion of the series of digital signals until all said identified in error portions have been transmitted.

36. The method of claim 35 wherein said repeating of steps (b) and (c) for the identified in error portions is cancellable upon command.

* * * * *